(12) United States Patent
Fisher

(10) Patent No.: US 6,510,695 B1
(45) Date of Patent: Jan. 28, 2003

(54) METHOD OF AND APPARATUS FOR PRODUCING POWER

(75) Inventor: Uriyel Fisher, Haifa (IL)

(73) Assignee: Ormat Industries Ltd., Yavne (IL)

( * ) Notice: Subject to any disclaimer, the term of this patent is extended or adjusted under 35 U.S.C. 154(b) by 0 days.

(21) Appl. No.: 09/336,585

(22) Filed: Jun. 21, 1999

(51) Int. Cl.$^7$ .............................................. F02C 6/18
(52) U.S. Cl. ..................... 60/780; 60/39.12; 60/39.181
(58) Field of Search ............................ 60/39.02, 39.12, 60/39.181, 780

(56) References Cited

U.S. PATENT DOCUMENTS

| | | | | |
|---|---|---|---|---|
| 3,993,458 A | * | 11/1976 | Antal, Jr. ...................... | 48/209 |
| 4,177,120 A | * | 12/1979 | Zenty ....................... | 204/157.1 |
| 4,229,184 A | * | 10/1980 | Gregg ......................... | 48/62 R |
| 4,415,339 A | * | 11/1983 | Aiman et al. ............... | 48/62 R |
| 5,236,470 A | * | 8/1993 | Levin .......................... | 48/210 |
| 5,417,052 A | * | 5/1995 | Bharathan et al. ......... | 60/39.02 |
| 5,578,140 A | * | 11/1996 | Yogev et al. ............... | 136/246 |
| 5,581,128 A | * | 12/1996 | Royle ......................... | 290/4 D |
| 5,657,624 A | * | 8/1997 | Kang et al. ................ | 60/39.02 |
| 5,704,206 A | * | 1/1998 | Kaneko et al. ............ | 60/39.12 |
| 5,927,063 A | * | 7/1999 | Janda et al. ............... | 60/39.02 |
| 5,934,065 A | * | 8/1999 | Bronicki et al. ......... | 60/39.181 |
| 6,233,914 B1 | * | 5/2001 | Fisher ....................... | 60/39.02 |

OTHER PUBLICATIONS

Doron, P. ed., "From Basic Research to Industry, " *Sun Day Symposium*, (title page, table of contents and forward) May 1996.

Sagie, D., "An Overview of Rotem's Activities in the Development of A Volumetric Solar Termal Receiver," presented at *Sun Day Symposium*, (abstract and complete entry) May 1996.

Fisher, U., "Heat to Power Conversion in the 'Beam Down' Solar System," presented at *Sun Day Symposium*, (abstract and complete entry) May 1996.

Epstein, M. et al., "Results of a Feasibility Study on the Possible Use of the Solar Tower Technology at the Dead Sea Works, " presented at *Sun Day Symposium*, () (abstract and complete entry) May 1996.

Epstein, M., "Solar Thermochemistry Activities at the Weizmann Institute of Science (WIS)," presented at *Sun Day Symposium*, (abstract and complete entry) May 1996.

* cited by examiner

*Primary Examiner*—Ehud Gartenberg
(74) *Attorney, Agent, or Firm*—Nath & Associates PLLC; Gary M. Nath; Jerald L. Meyer

(57) ABSTRACT

Apparatus for generating power using synthetic gas according to the present invention includes equipment constructed and arranged to reform a hydrocarbon gas, material or biogas produced from a source into synthetic gas. Supply means are provided for supplying hydrocarbon gas, material or biogas feedstock to a reformer contained in the equipment and the hydrocarbon material or biogas feedstock is produced by fuel producing apparatus by use of solar radiation. A gas turbine unit includes a compressor for producing compressed air, a combustor for combusting the synthetic gas and heating the compressed air to produce heated, compressed air, and a turbine coupled to a generator and to the compressor for expanding the heated, compressed air and producing power and hot exhaust gases. Further supply means are provided for supplying the synthetic gas produced by the equipment to the combustor, while a vaporizer preferably containing water is responsive to the hot exhaust gases produced by the gas turbine for producing steam. This steam can be used as process steam in, for example, an industrial process or in other cogeneration processes. Preferably, however, a steam turbine is provided for expanding steam produced by the vaporizer and producing power and expanded steam.

In addition, a method for carrying out the present invention makes use of the above mentioned apparatus for generating power using synthetic gas.

36 Claims, 1 Drawing Sheet

METHOD OF AND APPARATUS FOR PRODUCING POWER

TECHNICAL FIELD

This invention relates to equipment for reducing the consumption of fossil fuel by a power plant using solar radiation.

BACKGROUND OF THE INVENTION

Because of the problem of global warming, the finite supply of fossil fuels, and the stigma associated with the use of nuclear energy, interest exists in developing equipment and processes that rely on renewable energy sources, and in particular, solar energy, for power generation. Probably many decades will pass, however, before the switch from fossil fuels is complete.

It is therefore an object of the present invention to reduce the costs as well as the time involved in switching to solar based power plants with minimal risk and reduced capital expenses.

SUMMARY OF THE INVENTION

Apparatus for generating power using synthetic gas according to the present invention comprises equipment constructed and arranged to reform a hydrocarbon gas, material or biogas produced from a source into synthetic gas. Supply means are provided for supplying hydrocarbon gas, material or biogas feedstock to a reformer contained in the equipment and the hydrocarbon material or biogas feedstock is produced by fuel producing apparatus by use of solar radiation. A gas turbine unit includes a compressor for producing compressed air, a combustor for combusting the synthetic gas and heating the compressed air to produce heated, compressed air, and a turbine coupled to a generator and to the compressor for expanding the heated, compressed air and producing power and hot exhaust gases. Further supply means are provided for supplying the synthetic gas produced by the equipment to the combustor, while a vaporizer preferably containing water is responsive to the hot exhaust gases produced by the gas turbine for producing steam. This steam can be used as process steam in, for example, an industrial process or in other cogeneration processes. Preferably, however, a steam turbine is provided for expanding steam produced by the vaporizer and producing power and expanded steam.

In addition, a method for carrying out the present invention in which power is generated using synthetic gas comprises the steps of providing equipment constructed and arranged to reform a hydrocarbon gas, material or biogas produced from a source into synthetic gas. The hydrocarbon gas, material or biogas feedstock is supplied to a reformer contained in the equipment and the hydrocarbon gas, material or biogas feedstock is produced by use of solar radiation. A gas turbine unit is provided including a compressor for producing compressed air, a combustor for combusting the synthetic gas and heating the compressed air to produce heated compressed air, and a turbine coupled to a generator and to the compressor for expanding the heated compressed air and producing power and hot exhaust gases. supply means are provided for supplying synthetic gas produced by the equipment to the combustor and preferably water contained in a vaporizer and responsive to the hot exhaust gases is vaporized for producing steam. The steam can be provided for process steam in, for example, an industrial process or other cogeneration processes. Preferably, the steam produced by the vaporizer is expanded in a steam turbine producing power and expanded steam.

Alternatively, instead of providing a vaporizer for producing steam, organic fluid such as pentane, iso-pentane, etc. can be provided for producing power by making use of the organic fluid in an organic Rankine cycle system.

In a further alternative, rather than providing a bottoming power cycle, the hot, exhaust gases can be used for heating compressed air exiting the compressor of the gas turbine unit prior to supplying the compressed air to the combustor.

In addition, the hydrocarbon gas, material or biogas produced by the solar radiation can be combusted in the combustor for heating the compressed air produced by the compressor of the gas turbine unit.

Moreover, in a further embodiment, the compressed air produced by the compressor of the gas turbine unit can be heated by a solar receiver. In such a case, the fuel, e.g. the syngas, natural gas or hydrocarbon gas, material or biogas can be used as supplementary heating to bring the temperature of the heated air to the required level if necessary.

BRIEF DESCRIPTION OF THE DRAWINGS

An embodiment of the present invention is shown by way of example in the accompanying drawing wherein.

DETAILED DESCRIPTION

Figure 1:
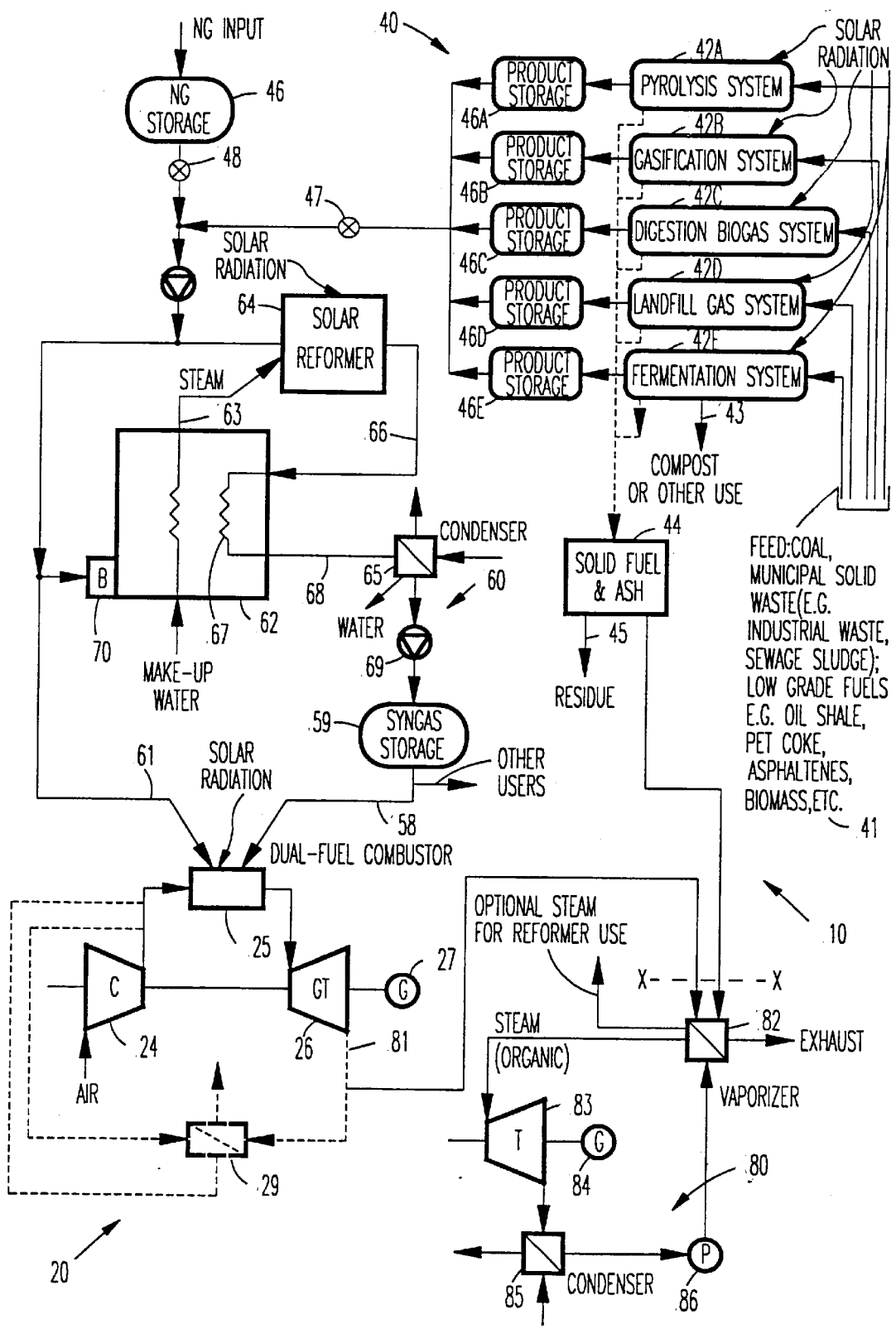
FIG. 1 is a block diagram of a power plant according to the present invention.

Referring now to the drawing, reference numeral 10 designates one embodiment of a power plant according to the present invention for generating power using synthetic gas. Plant 10 includes gas turbine unit 20, fuel producer apparatus 40, reformer apparatus 60, and bottoming turbine unit 80. Reformer apparatus 60 has equipment constructed and arranged to reform a hydrocarbon gas or material from a source into synthetic gas. Reforming actually refers to the use of heat for driving an endothermic chemical reaction between a hydrocarbon feedstock and steam or $CO_2$ in the presence of a catalyst. The result or products of such reaction is a mixture of hydrogen and carbon monoxide, and often, residual amounts of the feedstock. Such mixture is commonly referred to as synthetic gas or syngas.

The feedstock to a reformer can be a gas such as natural gas, LNG, LPG, hydrocarbon gas or biogas. The biogas can be produced from anaerobic digestion, landfill gas, gas produced by a fermentation system using a fermentation process, gas produced from a pyrolysis system, gas produced from a gasification system, etc. as shown in FIG. 1. Feed 41 for such a fuel producer apparatus, designated as numeral 40, can also be a solid or liquid carbonaceous material such as coal, and/or municipal solid waste (e. g. industrial waste, sewage sludge, etc.), biomass, other low grade fuels e. g. oil shale, oil residue, petcoke, asphaltenes, etc. and mixtures thereof. The reformed hydrogen enriched syngas has about 25% higher heat energy than the feedstock.

In this embodiment of the present invention, feed 41 is supplied to one of several devices, designated 42A–42E, for producing a product, a hydrocarbon gas or material or biogas, which can be stored as feedstock in product storage, designated 46A–46E, for later supply to the reformer. All of these devices use solar radiation as at least one of their heat inputs or sources. Thus, e. g. gasification system 42B utilizes solar radiation as one of its heat sources. The gasified product or biogas, produced by the fuel producer apparatus by use of solar radiation can be stored as feedstock in product storage 46B and supplied to solar reformer 64. Similarly, the other systems, designated 42A–42E, shown in the figure operate in a manner analogous to the gasification system described above. If insufficient solar radiation is available or one such system is not operable, valve 47 is closed and reformer 64 receives natural gas (NG) from NG storage 46 via valve 48.

Gas turbine unit 20 includes compressor 24 for compressing air to produce compressed air and combustor 25 for heating the compressed air to produce heated compressed air. Turbine 26, included in gas turbine unit 20, is coupled preferably to generator 27 and to the compressor for expanding the heated compressed air and producing power and hot exhaust gases in line 81. Combustor 25 is designed to burn natural gas (NG), biogas or syngas. Line 58 supplying syngas from storage tank 59, and line 61 supplying NG from storage tank 46 or biogas from apparatus 40 constitute supply means for supplying syngas produced by apparatus 60, biogas produced by apparatus 40 and NG from tank 46 to combustor 25. Furthermore, preferably, solar radiation via a solar receiver can be used as shown e. g. to heat the compressed air from compressor 24. In such a case, the fuel, e.g. the syngas, natural gas (NG) or hydrocarbon gas, material or biogas can be used as supplementary heating to bring the temperature of the heated air to the required level if necessary. Preferably, apparatus 60 utilizes solar radiation a heat source in reforming NG or other gas supplied from fuel producer apparatus 40 into syngas. Reformer apparatus 60 includes boiler 62 for producing steam in line 63, solar reformer 64 containing a catalyst and condenser 65. Reformer 64 receives NG from storage tank 46 or other gas from product storage 46A–46E, and is responsive to solar radiation and to steam from the boiler for reforming the NG or other gas into a precursor of syngas that exists the reformer in line 66. Operation using NG will normally take place during start-up or during supplementary firing when, e. g. there is insufficient solar radiation such as during cloudy periods. Since solar radiation is used in the reformer, relatively high temperatures are achieved in the solar reformer. Thus, the amount of contaminants present in the syngas produced from the hydrocarbon material or from the natural gas, even if such contaminants were present in the hydrocarbon material or natural gas, will be minimal.

Heat exchanger 67 associated with boiler 62 adds heat to the boiler and permits the reduction, or termination of the heat supplied by the burner 70. Water vapor in the syngas is extracted in condenser 65 and the dried syngas is supplied to pump 69 which delivers the syngas to storage tank 59.

During periods of solar radiation, apparatus 60 converts NG or gas produced from source 41 to syngas which is stored in tank 59. Depending upon the flow rate of NG into storage tank 46, the sizes the storage 59 and 46, the fuel consumption of turbine 26, and the amount of solar radiation, operation of gas turbine unit 20 may be sustained by supplying only syngas to combustor 25. However, for practical reasons, it is preferred to provide NG backup for operation of the power plant. Thus, NG is supplied to burner 70 that fires boiler 62 of apparatus 60 as well as to line 61 that supplied NG to combustor 25.

As shown in FIG. 1, power plant 10 includes vaporizer 82 preferably containing water and responsive to hot exhaust gases in line 31 for producing steam, and steam turbine 83 coupled to generator 84 for expanding steam produced by the vaporizer and producing power and expanded steam. The expanded steam is condensed in condenser 85 to condensate which pump 86 returns to the vaporizer.

Vaporizer 82 in FIG. 1 may take various forms and designator X—X in FIG. 1 denotes a symbolic separator that indicates a connection to any one of several devices operating on exhaust gases from a turbine. For example, a waste heat boiler like that shown in FIG. 1 below the designator X—X could be used, or a steam boiler could be used. Solid fuel or ash 44 can be used or combusted in such waste heat boiler systems. Alternatively, in a further embodiment of the present invention, rather than using the steam produced to operate a steam turbine, the steam or portion thereof can be used for process heating or in other cogeneration processes. Furthermore, portion of the steam produced can be used as optional steam for reformer 64.

Furthermore, as shown in FIG. 1, rather than using water as the working. fluid in the power bottoming cycle cycle 80, an organic working fluid, such as pentane, iso-pentane, etc., can be used in this power, bottoming cycle for producing power by expanding organic vapor in the turbine.

In addition, rather than providing a bottoming power cycle, the hot exhaust gases can be used for recuperating heat or heating, in heat exchanger 29, compressed air exiting compressor 24 of gas turbine unit 12 prior to supplying the compressed air to combustor 25.

Additionally, the produced syngas (i.e. hydrogen enriched gas) can be used for other purposes as shown in FIG. 1 such as for fueling fuel cells or as fuel for land, sea or air vehicles, etc.

In a further alternative, fuel producer apparatus 40 can operate or produce a product, a hydrocarbon gas, material or biogas, in accordance with the present invention, with heat sources other than solar radiation as one of its heat inputs or sources.

Moreover, it should be noted that supply means or lines mentioned in this specification refers to suitable conduits, etc.

In situations where gas pipelines pass through a region where solar radiation is relatively high, the present invention can be used for solar reforming some or all of the gas to syngas. The thus produced syngas can be added to the gas flowing in the pipeline, and/or can be directed to a gas turbine unit, or a combined cycle power plant associated with the solar reformer for producing electricity.

It is believed that the advantages and improved results furnished by the method and apparatus of the present in are apparent from the foregoing description of the invention. Various changes and modifications may be made without departing from the spirit and scope of the invention as described in the claims that follow.

What is claimed is:

1. Apparatus for generating power using synthetic gas comprising:
  a) equipment constructed and arranged to reform a hydrocarbon gas from a source into a synthetic gas using solar radiation, said equipment including a steam generator generating steam using heat from the reformer equipment;
  b) supply means for supplying hydrocarbon gas or material feedstock to a reformer contained in said equipment, said hydrocarbon material feedstock produced by fuel producing apparatus by use of solar radiation;
  c) a gas turbine unit including a compressor for compressing air to produce compressed air, a combustor for combusting said synthetic gas and heating said compressed air to produce heated compressed air, and a turbine coupled to a generator and to said compressor for expanding said heated compressed air and producing power and hot exhaust gases;

d) further supply means for supplying said synthetic gas produced by said equipment to said combustor;

e) a vaporizer containing organic working fluid and responsive to said hot exhaust gases for producing organic working fluid vapor;

f) a vapor turbine for expanding said organic working fluid vapor and producing power and from which expanded organic working fluid vapor exits;

g) a condenser for condensing said expanded organic working fluid vapor and producing organic working fluid condensate, whereby said organic working fluid condensate is supplied to said vaporizer; and h) said vaporizer also responsive to heat from solid fuel and ash remaining after said fuel producing apparatus has produced said hydrocarbon material feedstock by use of solar radiation.

2. Apparatus according to claim 1 including a steam turbine for expanding steam produced by said vaporizer and producing power and expanded steam.

3. Apparatus according to claim 1 wherein said supply means supplies hydrocarbon material feedstock produced by use of solar radiation which gasifies low grade matter.

4. Apparatus according to claim 3 wherein said low grade matter comprises municipal waste.

5. Apparatus according to claim 3 wherein said low grade matter comprises asphaltenes.

6. Apparatus according to claim 3 wherein said low grade matter comprises biomass.

7. Apparatus according to claim 1 wherein said supply means supplies hydrocarbon material feedstock produced using solar radiation which pyrolyses low grade matter.

8. Apparatus according to claim 7 wherein said low grade matter comprises municipal waste.

9. Apparatus according to claim 7 wherein said low grade matter comprises asphaltenes.

10. Apparatus according to claim 7 wherein said low grade matter comprises biomass.

11. Apparatus according to claim 1 wherein said supply means supplies hydrocarbon material feedstock produced using solar radiation which gasifies coal.

12. A method of generating power using synthetic gas comprising the steps of:

a) providing equipment constructed and arranged to reform a hydrocarbon gas from a source into a synthetic gas using solar radiation, said equipment including a steam generator generating steam using heat from the reformer equipment;

b) supplying hydrocarbon material feedstock to a reformer contained in said equipment, said hydrocarbon material feedstock produced by fuel producing apparatus by use of solar radiation;

c) providing a gas turbine unit including a compressor for compressing air to produce compressed air, a combustor for combusting said synthetic gas and heating said compressed air to produce heated compressed air, and a turbine coupled to a generator and to said compressor for expanding said heated compressed air and producing power and hot exhaust gases;

d) supplying said synthetic gas produced by said equipment to said combustor;

e) vaporizing organic working fluid contained in an organic working fluid vaporizer responsive to said hot exhaust gases for producing organic working fluid vapor;

f) expanding said organic working fluid vapor produced by said vaporizer in a vapor turbine and producing power and from which expanded organic working fluid exits;

g) condensing said expanded organic working fluid in a condenser and producing organic working fluid condensate whereby said organic working fluid condensate is supplied to said vaporizer; and h) utilizing heat from solid fuel and ash remaining after said fuel producing apparatus has produced said hydrocarbon material feedstock by use of solar radiation in said vaporizer to also produce said working fluid vapor.

13. A method according to claim 12 wherein the step of supplying hydrocarbon material feedstock is carried out by supplying hydrocarbon material feedstock produced by fuel producing apparatus by use of solar radiation which gasifies low grade matter.

14. A method according to claim 13 wherein the step of supplying hydrocarbon material feedstock produced by fuel producing apparatus by use of solar radiation is carried out by supplying hydrocarbon material feedstock produced by fuel producing apparatus by use of solar radiation which gasifies municipal waste.

15. A method according to claim 13 wherein the step of supplying hydrocarbon material feedstock produced by fuel producing apparatus by use of solar radiation is carried out by supplying hydrocarbon material feedstock produced by fuel producing apparatus by use of solar radiation which gasifies asphaltenes.

16. A method according to claim 13 wherein the step of supplying hydrocarbon material feedstock producby fuel producing apparatus by use of solar radiation is carried out by supplying hydrocarbon material feedstock produced by fuel producing apparatus by use of solar radiation which gasifies biomass.

17. A method according to claim 12 wherein the step of supplying hydrocarbon material feedstock is carried out by supplying hydrocarbon material feedstock produced by fuel producing apparatus by use of solar radiation which pyrolyses low grade matter.

18. A method according to claim 17 wherein the step of supplying hydrocarbon material feedstock produced by fuel producing apparatus by use of solar radiation is carried out by supplying hydrocarbon material feedstock produced by fuel producing apparatus by use of solar radiation which pyrolyses municipal waste.

19. A method according to claim 17 wherein the step of supplying hydrocarbon material feedstock produced by fuel producing apparatus by use of solar radiation is carried out by supplying hydrocarbon material feedstock produced by fuel producing apparatus by use of solar radiation which pyrolyses asphaltenes.

20. A method according to claim 17 wherein the step of supplying hydrocarbon material feedstock produced by fuel producing apparatus by use of solar radiation is carried out by supplying hydrocarbon material feedstock produced by fuel producing apparatus by use of solar radiation which pyrolyses biomass.

21. A method according to claim 13 wherein the step of supplying hydrocarbon material feedstock produced by fuel producing apparatus by use of solar radiation is carried out by supplying hydrocarbon material feedstock produced by fuel producing apparatus by solar radiation which gasifies pet-coke.

22. A method according to claim 17 wherein the step of supplying hydrocarbon material feedstock produced by fuel producing apparatus by use of solar radiation is carried out by supplying hydrocarbon material feedstock produced by fuel producing apparatus by use of solar radiation which pyrolyzes pet-coke.

23. Apparatus according to claim 4 wherein said municipal waste comes from a landfill gas system.

24. Apparatus according to claim 4 wherein said municipal waste comes from a fermentation system.

25. Method according to claim 14 wherein said municipal waste is gasified in a landfill gas system.

26. Method according to claim 14 wherein said municipal waste is gasified in a fermentation system.

27. Apparatus for generating power using synthetic gas comprising:
   a) solar reformer equipment constructed and arranged to solar reform a hydrocarbon gas from a source into a synthetic gas, said solar reformer equipment including a steam generator generating steam using heat from the reformer equipment;
   b) supply means for supplying hydrocarbon gas or material feedstock to a reformer contained in said equipment, said hydrocarbon material feedstock produced by fuel producing apparatus by use of solar radiation;
   c) a gas turbine unit including a compressor for compressing air to produce compressed air, a combustor for combusting said synthetic gas and heating said compressed air to produce heated compressed air, and a turbine coupled to a generator and to said compressor for expanding said heated compressed air and producing power and hot exhaust gases;
   d) further supply means for supplying said synthetic gas produced by said equipment to said combustor;
   e) a vaporizer containing organic working fluid and responsive to said hot exhaust gases for producing organic working fluid vapor;
   f) a vapor turbine for expanding said organic working fluid vapor and producing power and from which expanded organic working fluid vapor exits;
   g) a condenser for condensing said expanded organic working fluid vapor and producing organic working fluid condensate, whereby said organic working fluid condensate is supplied to said vaporizer; and
   h) utilizing heat from solid fuel and ash remaining after said fuel producing apparatus has produced said hydrocarbon material feedstock by use of solar radiation in said vaporizer to also produce said organic working fluid vapor.

28. Apparatus according to claim 27 wherein said supply means for supplying hydrocarbon gas or material feedstock to a reformer contained in said equipment includes a gasification system or pyrolyzer for gasifying or pyrolyzing said hydrocarbon feedstock by use of solar radiation.

29. Apparats according to claim 27 wherein said supply means for supplying hydrocarbon gas or material feedstock to a reformer contained in said equipment includes a digester for digesting said hydrocarbon feedstock that produces biogas by use of solar radiation.

30. Apparatus according to claim 1 wherein said supply means for supplying hydrocarbon gas or material feedstock to a reformer contained in said equipment includes a system for producing landfill gas from said hydrocarbon material feedstock by use of solar radiation.

31. Apparatus according to claim 1 wherein said solid fuel is combusted and the heat produced by the combustion is added to said vaporizer for producing said organic working fluid vapor.

32. Apparatus according to claim 27 wherein said organic working fluid comprises pentane.

33. Apparatus according to claim 27 wherein said organic working fluid comprises iso-pentane.

34. A method according to claim 12 including the step of combusting said solid fuel and adding the heat produced by the combustion to said vaporizer for producing said organic working fluid vapor.

35. A method according to claim 12 wherein the step of vaporizing said organic working fluid is carried out by vaporizing pentane.

36. A method according to claim 12 wherein the step of vaporizing organic working fluid is carried out by vaporizing iso-pentane.

* * * * *